Figure 11:
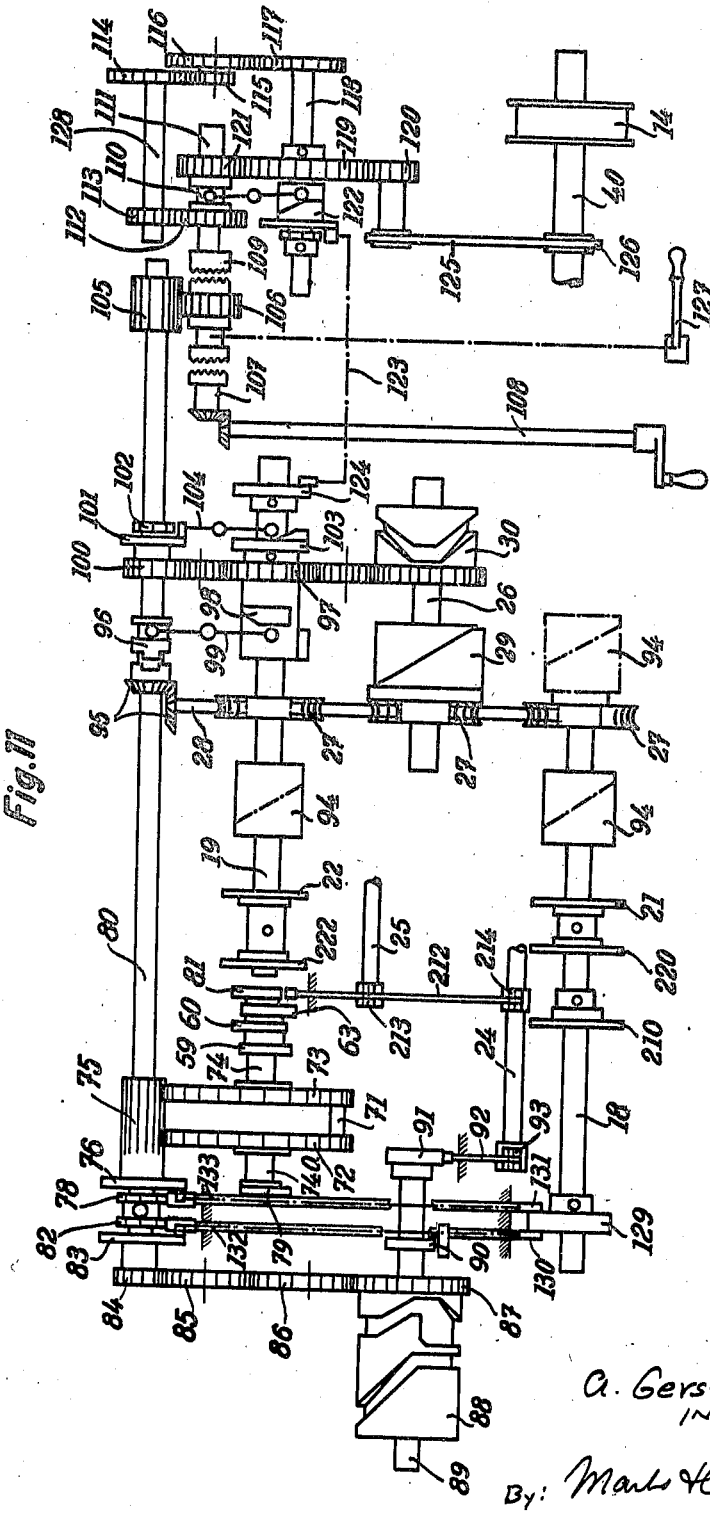

Aug. 9, 1932.  A. GERSTADT  1,870,724
MULTIPLE SPINDLE AUTOMATIC SCREW MACHINE
Filed Jan. 28, 1930   7 Sheets-Sheet 1
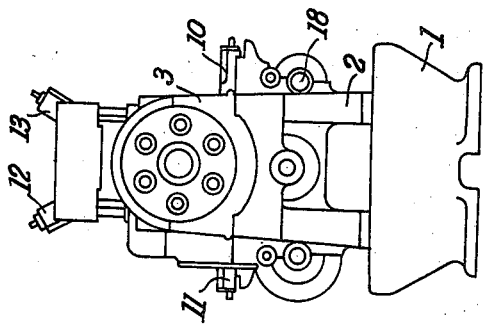
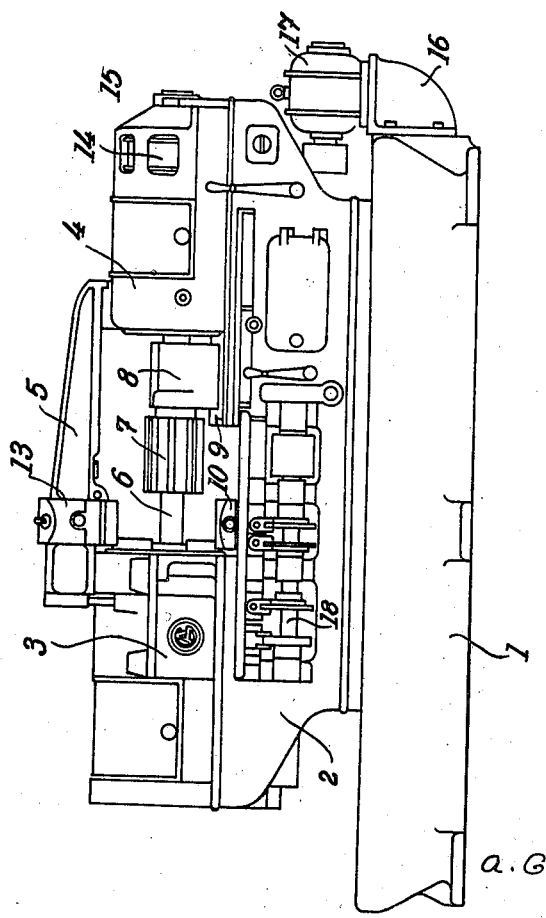
a. Gerstadt
INVENTOR
By Marks & Clerk
Attys.

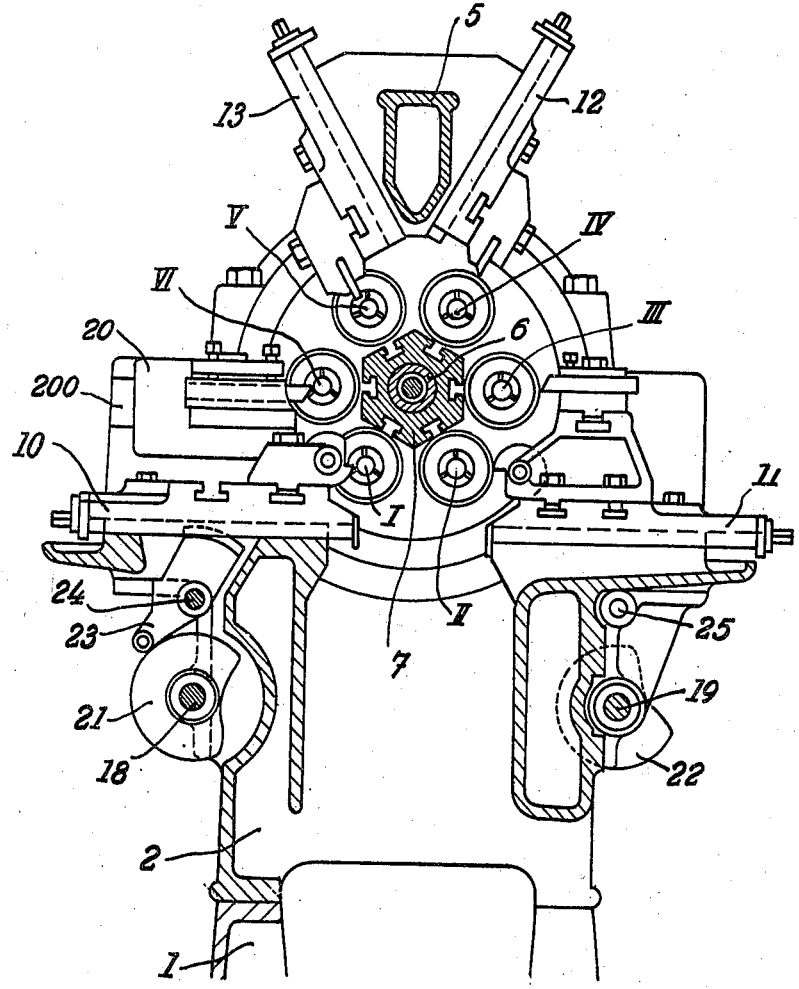

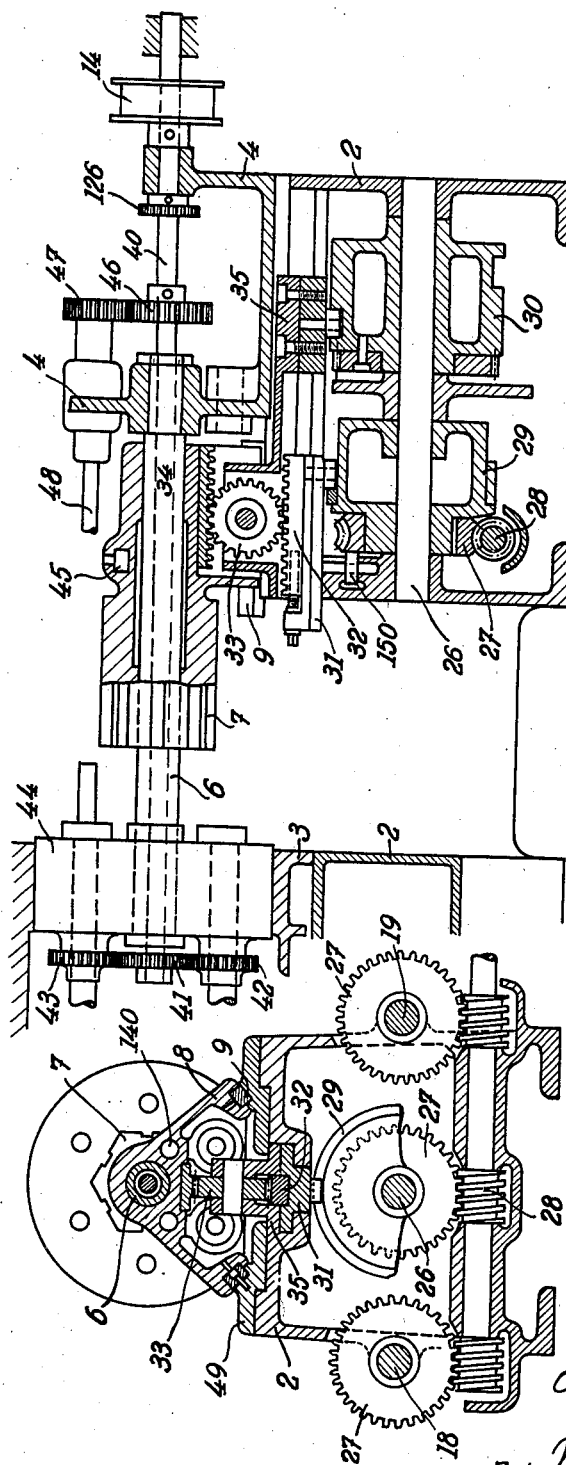

Aug. 9, 1932.  A. GERSTADT  1,870,724
MULTIPLE SPINDLE AUTOMATIC SCREW MACHINE
Filed Jan. 28, 1930  7 Sheets-Sheet 4
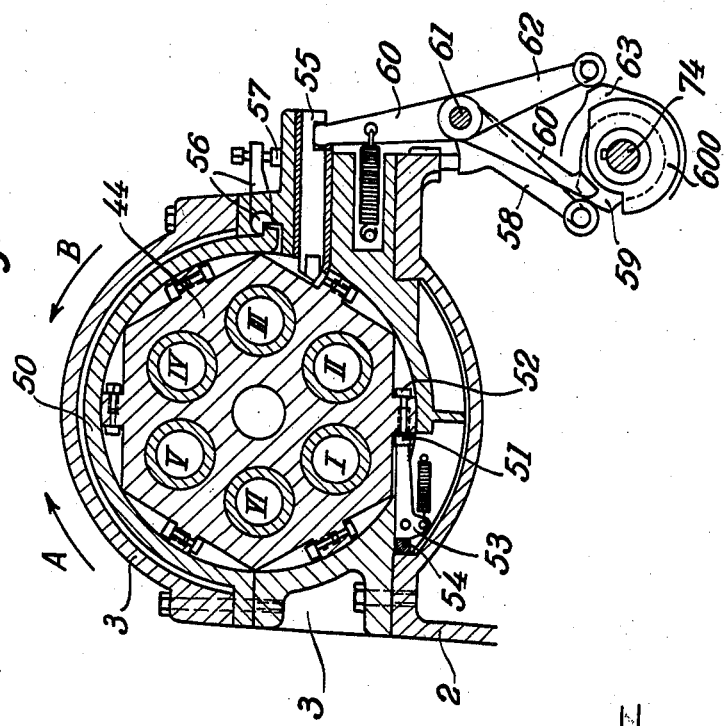
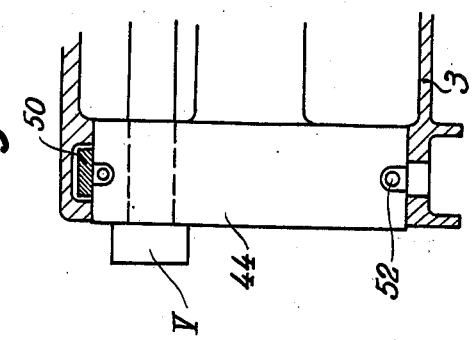
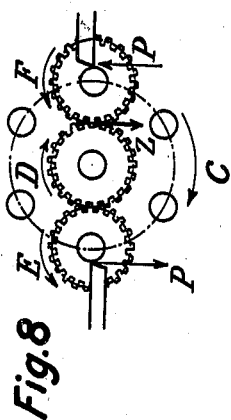
A. Gerstadt
INVENTOR
By: Marks & Clerk
ATTYS.

Aug. 9, 1932.          A. GERSTADT          1,870,724
MULTIPLE SPINDLE AUTOMATIC SCREW MACHINE
Filed Jan. 28, 1930          7 Sheets-Sheet 5
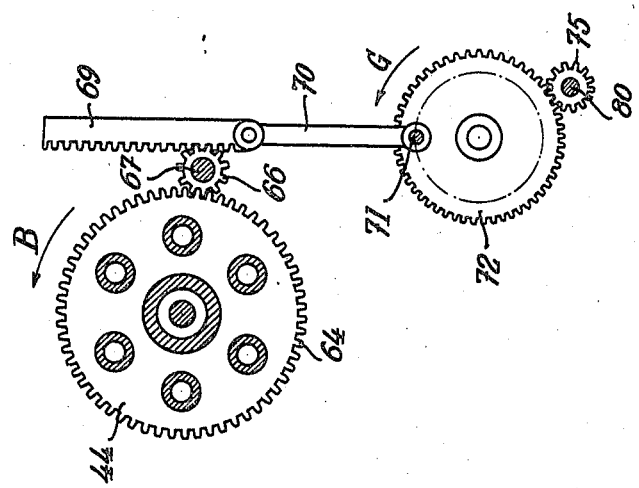
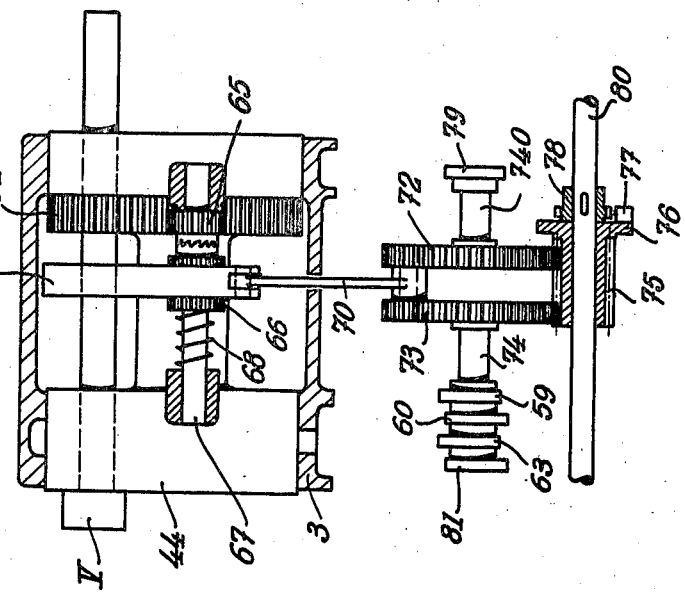
A. Gerstadt
INVENTOR
By: Marks & Clerk
Attys.

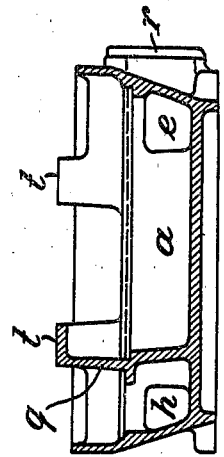
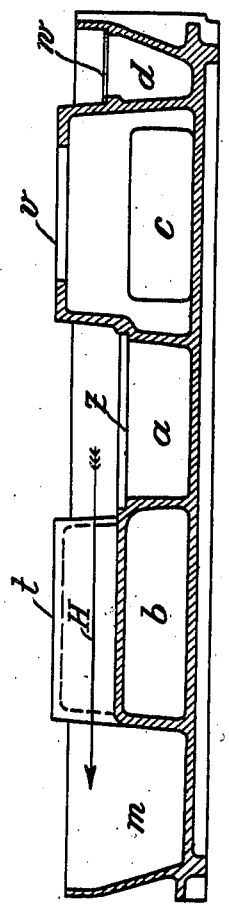
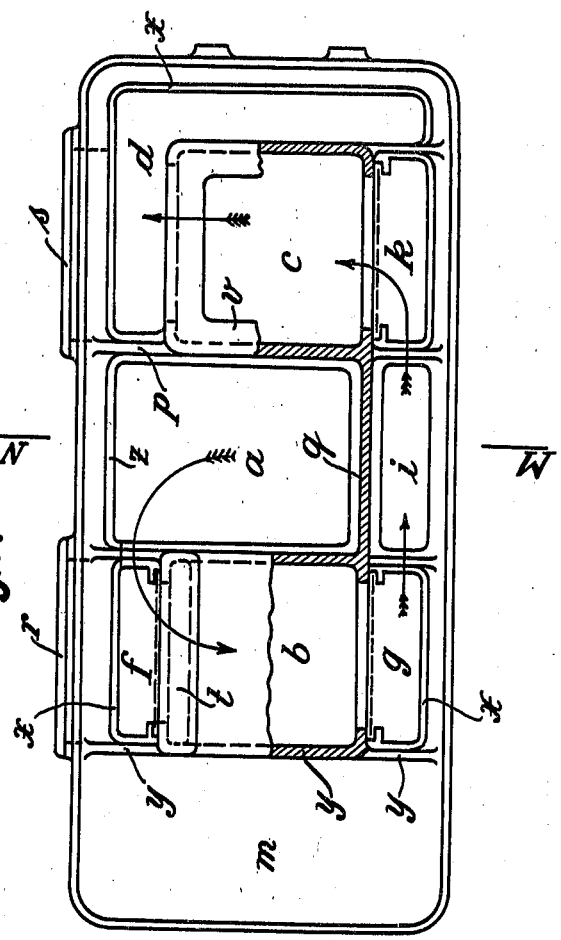

Patented Aug. 9, 1932

1,870,724

UNITED STATES PATENT OFFICE

ANTON GERSTADT, OF BERLIN-CHARLOTTENBURG, GERMANY

MULTIPLE SPINDLE AUTOMATIC SCREW MACHINE

Application filed January 28, 1930, Serial No. 424,125, and in Germany January 31, 1929.

The present invention relates to a multiple-spindle automatic screw machine. More particularly, the invention relates to a machine of this class which is adapted to simultaneously and progressively work upon a piece at several spindles, so that a piece is finished after each turning of the drum. The novelty consists in this, that for the central tool carriage separate drives are provided, while positively connected drives are used for the working strokes and idle movements. The side slides, however, are provided with a quick positive return stroke, whereas the quick advance is, in the usual manner, effected by an acceleration of the working cam. The idle movements, turning of the drum, securing and feed of the stock, is not effected by the main cam shaft, but by means of a driving shaft driven with two different speeds. This shaft also effects the quick return movement of the heavy central tool carriage and the quick feed to the cutting position. This is obtained by a completely new driving gear which hitherto has not been used in connection with automatic screw machines. The new arrangement allows the use of very small easily accessible cams and drums, so that with the highest speed and capacity a rigid machine bed may be obtained which in multiple-spindle automatic screw machines used hitherto is, as a rule, prevented by the very great diameters of the cams and the central cam shaft.

Moreover, the new machine is provided with a novel spindle arrangement and therefore a novel manner of turning, locking and braking of the spindle drum as well as a novel guide for the central tool carriage is provided which together permit the highest speeds and cutting capacity. Besides this a novel construction of the cuttings pit is provided, so that the chips are immediately separated from the lubricating liquid. To this end the cuttings are fed by a conveyer belt to a cuttings pit arranged away from the oil container, so that, for cooling purposes, the lubricating medium must pass, separated from the hot cuttings, through several reservoirs, separated from each other by sieves, before it is returned to the pump. Hereby the lubricating medium is, on account of the very great surface, intensively cooled and perfectly freed even from the smallest cuttings, so that wear of the pump is absolutely prevented.

The multiple-spindle automatic screw machines known hitherto are all provided with a cam shaft arranged in the centre of the bed upon which are fixed the several cams for the working—and idle strokes. The diameters of the cams must be chosen very great, as during one revolution of this cam shaft all movements must be performed. Specially mounted cam members are here necessary for each piece of work. Very steep pitch angles must be chosen for these cam members which, however, under high pressures, often cause breakage of the cam levers and which permit a moderate increase of the speed only. Moreover, this cam shaft must alternately be quickly and slowly driven which requires the use of a very complicated and sensitive mechanism. The several carriages or slides on running against these steep cams often have to withstand very hard blows and the movements are very inaccurate, so that always a certain play must be provided to prevent the tools from running into the material under high speed which always causes a great loss of time.

The separation of the drive for the working movements from that of the idle travel has hitherto only been carried out in single-spindle automatic screw machines and in one type of an American multiple-spindle machine. All these machines are, however, used for the production of very small articles, as in all cases the carriages must be returned by means of springs which is possible with light mechanisms only. Special cam sets are, moreover, required for each piece of work.

The auxiliary devices of the known multiple-spindle automatic screw machines in which the central tool carriages are moved by cams are bound to a particular spindle distribution, so that the cut off or the stock feed must always occur at the same spindle. Moreover, in these cases one and the same spindle is always constructed as the thread cutting spindle, or the quick drilling device is limited to one or two spindles at the most.

The power drive point is in most cases situated outside the guide of the central tool carriage and outside the spindle circle, so that during operation the spindles tend to tipping and are not adapted to do exact or heavy work. Multiple-spindle screw machines have also become known in which the central tool carriage is centrally moved by a screw spindle but on account of the high peripheral speed of the driving mechanism the reverse of a spindle is so inaccurate that no safety of working is warranted and interruptions occur permanently. Moreover, on account of the great drum cams the beds of the machines cannot be made as rigid as is required to withstand the great forces which occur in these machines. Particularly great difficulties makes the discharge of the cuttings, as the free passage of the same is prevented by the mechanisms arranged in the interior of the bed and by the unfavorable spindle distribution.

All these disadvantages are, according to the present invention, removed by the novel drive and arrangement of the cam shafts as well as by the novel spindle distribution. Hereby small cam diameters and high speeds, a rigid machine bed allowing a free discharge of the cuttings, a positive guide of the central tool carriage and a perfect view, no special cams, a cooled lubricating medium free of cuttings, no troublesome pipings and the possibility are obtained to use any of the spindles for drilling and thread cutting work as well as for any auxiliary operations.

The invention is shown by way of example in the accompanying drawings in connection with a six-spindle machine, but naturally the invention may just as well be used in connection with a four- or five-spindle machine. If necessary the gears may be so arranged that the six-spindle machine may operate as two three-spindle machines.

In the drawings:

Fig. 1 is a front elevation of the machine embodying the present invention. Fig. 2 shows an end elevation looking from the stock side. Fig. 3 is a cross section with the side carriage arrangement seen against the spindle drum. Fig. 4 is a cross section through the central tool carriage. Fig. 5 shows a longitudinal section through the revolving mechanism and its drive. Fig. 6 is a longitudinal section through the front portion of the spindle box. Fig. 7 shows a cross section through the spindle drum illustrating the locking and braking mechanisms. Fig. 8 is a diagrammatic view of the driving gear of the spindle turret drum. Fig. 9 is a rear view of the turning gear of the spindle drum partly in section. Fig. 10 is a side view of Fig. 9. Fig. 11 shows a diagrammatic view of the gear arrangement in which all parts are supposed to be situated in one horizontal plane. Fig. 12 shows a central section through the under frame and the cuttings pit. Fig. 13 is a section on line M—N of Fig. 12. Fig. 14 illustrates a top plan view of Fig. 12 showing the arrangement of the several oil containers.

As shown in Fig. 1, the machine bed 2 is mounted upon the cuttings pit serving simultaneously as the under frame 1 for the automatic machine. At the left-hand side of the bed 2 the spindle box 3 is arranged, whereas at the right-hand side the drive box 4 is provided. Both boxes 3 and 4 are connected together by a bridge 5 and the hollow central shaft 6. Slideably arranged upon the hollow shaft 6 is the central tool carriage 7 which is held against rotation by the guides 8 arranged at an angle of less than 90°. The guides 8 slide at the right and the left upon guide rails 9 fixed to the bed 2 and to the prolonged drive box 4. The guide rails 9 may in any well known manner be so adjusted, that the central tool carriage 7 may be swung about its central axis to bring the clamping surface of the central tool carriage in the exact position relatively to the centres of the spindles. The weight of the central tool carriage 7 is carried by the guides 8 and 9, so that the centre shaft 6 is relieved and saved. As shown in Fig. 3, the cross or side carriages 10 and 11 are mounted upon the bed 2 and the cross or side carriages 12 and 13 on the bridge 5.

The machine is driven by the belt pulley 14 journalled in the gear box 4 and covered by a guard 15. A bracket 16 is provided at the cuttings pit 1 for mounting a motor 17 if the machine is to be driven electrically. The carriages 10 to 13 are moved by two cam shafts 18 and 19 arranged at the front and rear side respectively of the bed 2. As will be seen from Fig. 3, the machine here described is supposed to have six spindles I–VI the arrangement of which is shown in this figure. The positions I and II are supposed to be for rough cutting operations and are therefore arranged at the lowest working position, as here the most cuttings are formed which at this place may easily be discharged. The two heavy stressed carriages 10 and 11 also may be arranged at this point upon the bed 2. The positions IV and V are for the fine cutting operations and the positions III and VI for the cutting off. As the cutting off is always necessary for machines working from the bar, a special cutting off carriage is provided at the spindle position VI which carriage is movably arranged upon a guide 200 cast at the lower portion 3 of the spindle box. The several cross or side carriages are moved in the usual manner by cam discs 21, 22, 210, 220 and 222 and toothed segment levers which are rotatably arranged upon the shafts 24 and 25 in the bed 2.

As will be seen from Fig. 5, the central tool carriage 7 is moved by two drum cams 29 and 30 arranged upon a shaft 26 and intermittently rotated by two drives which are separated from each other but are in positive connection. The cam 29 effects the working stroke of the central tool carriage 7, whereas the cam 30 effects the idle movements of the same. The cam 29 transfers its movement upon a slide 31 which carries an adjustable rack 32. The rack 32 engages with a toothed wheel 33 and this in turn with a rack 34 fixed to the central tool carriage 7. The gear wheel 33 is rotatably mounted in a slide 35 which is moved by the cam 30. As shown in Fig. 4, the gear wheel 33 is so arranged, that the point of application of the force to be transferred to the central tool carriage 7 is located within the guides 8 and 9 and the central shaft 6 and within the range of the spindles, so that a tipping of the central tool carriage is completely impossible even when performing heavy cuts. By this arrangement of the guides the upper surfaces of the central tool carriage are free for the attachment of any desired additional devices. As may be seen from Fig. 5, the gear wheel 33 is, during the alternating movements of the slide 35, rolled over the rack 32 or the rack 34, depending upon whether the carriage 7 or the slide 31 offers a greater resistance. If, for instance, the slide 35 is, as shown in Fig. 5, arrested in its left-hand dead point, the movement of the cam 29 is directly transferred to the central tool carriage 7, so that the latter makes exactly the same way to the left as the slide 31 makes to the right under the influence of the cam 29. During the operation of the cam 29, the cam 30 for the idle movement is arrested. When, however, the high point on the cam 29 reaches its uppermost position, i. e. when the slide 31 occupies its right-hand dead point and the central tool carriage 7 has reached its outermost left-hand position, the movement of the cam 30 is started and this cam draws the slide 35 to the right. As, however, the slide 31 in its right-hand dead point bears against a stop of the machine bed, the rack 32 cannot move to the right, so that the wheel 33 rolls over the rack 32 and pulls the central tool carriage 7 back into its rearmost right-hand position. As the slide 35 attacks the wheel 33 in its pivot point, the carriage 7 makes double the way of the stroke of the idle cam 30. This ingenious arrangement allows the return stroke given by the cam to be reduced to half the amount of the travel of the carriage, so that the diameter of the drum cam may also be reduced to half that of the usual diameter, whereby also the speed may be considerably increased. Furthermore, by the separation of the working- and idle-ways upon two cams, the working cam also may considerably be reduced. Hereby a much more rigid machine bed is obtained than with all hitherto known multiple-spindle automatic machines having a centrally arranged cam shaft. This is due to the fact, that all cams require less space than the great drum cams used hitherto and yet may easily be arranged in the interior of the bed 2.

As the cam 30 for the idle movement always makes a complete revolution, the slide 35 is during the second half of the cam rotation shifted from its right-hand dead point to its left-hand dead point again. Now, as the central tool carriage 7 by its weight requires more power for its displacement than the slide 31, the latter also is shifted to the left until its cam roller again meets the cam 29 and prevents a further movement. If now the cam 30 has not yet reached its end position, the remaining movement is transferred to the central tool carriage 7, that is to say, the tools are by the cam 30 under the quick idle stroke again advanced to the cutting position, whereupon the working stroke at once begins again, as in the mean time the cam 29 is again rotated. As the return stroke is not effected by the working cam 29, the cam stroke corresponding to the return movement may be very steep, i. e. about vertical, so that on the working cam nearly no way distance is required for the return movement. This fact also allows a small working cam drum. On account of the separation of the working cam from the idle stroke cam, the idle stroke cam 30 has at liberty for its way the complete periphery, so that in spite of increased speed the operation is very smooth.

The working cam 29 is, by means of the worm wheel 27, worm shaft 28, bevel gears 95 and clutch 96, driven from the shaft 80 which, as shown in Fig. 11, is journalled in the rear portion of the machine bed 2. The idle stroke cam 30 also is driven from the shaft 80 by means of the wheels 100, the coupling disc 101, driving wheel 102 and wheel 97 which is rigidly connected to the cam drum 98 and loosely arranged upon the shaft 19. The intermittent start of the movement of these two cams is effected by a cam disc 103, fixed upon the rear cam shaft 19, always in the moment in which the working cam 29 has reached its uppermost position, i. e. when the central tool carriage 7 has reached the end of its working stroke. The cam disc 103 engages and disengages, by means of the lever 104, in a well known manner the pawl of the disc 101 and the connection is maintained until the cam 30 has made a complete revolution. If the working stroke of the cam 29 is completely utilized, so that no cam way upon this drum is available for the return stroke, the working cam 29 may be temporarily arrested during the movement of the idle stroke cam which always is effected under high speed. The cam 29 is arrested by the cam 98, loosely arranged upon the cam shaft 19, the lever 99 and the clutch 96. The cam 98 also restarts the movement for the working cam 29. As will be seen from Fig. 13

4, the two cam shafts 18 and 19 are driven by the worm shaft 28. The worm wheels 27 upon the shafts 18, 19 and 26 are of equal diameter, so that all three shafts are simultaneously and with the same speed rotated and arrested. The idle stroke cam 30, however, is loosely arranged upon the shaft 26 because it must rotate with another speed than the cam 29. The movement of the shaft 80 is started by the main drive and the main driving disc is mounted upon the central driving shaft 40. As shown in Fig. 5, the drives for the working spindles as well as for the drilling and thread-cutting devices are derived from the shaft 40 by means of the gears 41, 42, 43 and the gears 46, 47 and shaft 48 respectively. The drive of the shaft 80 by the shaft 40 is effected by means of chain 125 and sprocket wheel 126 by way of a gear box, shown diagrammatically in Fig. 11 and containing the gears 119, 120 and 121 for the quick idle stroke as well as the change speed gears 112, 113, 114, 115, 116 and 117 for the working stroke. The working stroke as well as the idle stroke act at a given time upon a shaft 111 which by a clutch 110 may alternatively be coupled to these two driving means. The clutch 110 is operated by a cam 122 which is engaged and disengaged by a well known pawl coupling. The engagement and disengagement is effected by a cam disc 124 fixed upon the cam shaft 19. The movement is transferred from the gear box or the shaft 111 to the shaft 80 by the two gears 105 and 106 the latter of which is constructed as slide wheel having two clutch members and may be coupled either to the clutch 109 mounted upon the shaft 111 or to the clutch wheel 107 which is connected to the hand crank shaft 108. The displacement of the gear 106 is effected by a hand lever 127. This arrangement prevents in a very simple manner the starting of the movement by hand during the operation of the machine and, moreover, the hand crank is arrested as long as the shaft 80 is coupled with the power drive.

As the shaft is rotated with the slow speed of the working stroke as well as with the high speed of the idle movements, the movements for turning the spindle drum and for feeding and clamping the material to be treated are also derived from this shaft. These movements also are started by the well known pawl couplings. The turning of the spindle drum is effected by the driving disc 78 fixed to the shaft 80 and the pawl disc 76 with the toothed wheel 75. The operation of the clamping and feeding cam 88 is effected by the driving disc 82, pawl disc 83 and gears 84, 85, 86 and 87. These two movements are started by the double cam disc 129 the cam 130 of which and the rod 132 serve to actuate the clamping and feed, whereas the cam 131 and the rod 133 turn the drum.

As will be seen from Figures 9, 10 and 11, the turning of the spindle drum 44 is effected by a gear 75, loosely arranged upon the shaft 80, which at a given moment is intermittently rotated by the feed gear 78, fixed to the shaft 80, and the pawl disc 76. The gear 75 engages with two gears 72 and 73 fixed upon the divided feed shaft 74 and 740 respectively and connected by a crank pin 71. The latter carries a link 70 by which a rack 69 is moved up- and downwardly. The rack 69 engages a coupling gear 66 which temporarily may be coupled to a counter-coupling gear 65, arranged upon the common shaft 67 and constantly engaging the spindle drum gear 64. The coupling teeth of the two gears 65 and 66 act in one direction only, so that during the up and down movement of the rack 69 the down stroke only is transferred to the spindle drum 44 as rotating movement in the direction of the arrow B.

The snapping in of the two gears 65 and 66 is effected by a spring 68. As the turning of the spindle drum 44 is effected by a crank drive, the turning is performed absolutely free of jerks, so that no blows occur against the locking device and a jumping over of the drum is absolutely prevented. As the crank pin 71 is journalled in two gears, a uniform tensile strain is obtained and a breakage is impossible. The shaft 67 is, as may be seen from Fig. 10, journalled in the spindle box 3 laterally to the spindle drum 44 at the side at which the turning direction of the drum is upward, so that, during the turning, the drum is lifted a little and the tooth pressure upon the toothed ring 64 counteracts the weight of the drum and tends to lift the drum, whereby the turning is facilitated, as the friction is reduced, and the bearings of the drum are saved.

Fig. 6 and 7 show the locking of the spindle drum 44. At the rear of the machine the bolt 55 is arranged in the spindle box 3 below the centre of the drum, so that its inclined surface which runs centrally to the centre of the drum causes, on snapping in, a rotation of the spindle drum 44 in a direction opposite to that of the arrow B. The turning stroke is chosen a little greater than 60°, so that the stop pawl 53 may positively engage before the locking. The bolt 55 is shifted by two cam discs 600 and 63, fixed to the feed shaft 74. The disc 600 disengages the bolt 55 by means of the two-armed lever 60, while after the snapping in of the bolt 55 the disc 63 effects, by means of the lever 62 rigidly fixed to the lever 60, a pressing in of the bolt.

This is, on account of the high weight of the spindle drum, of very great advantage, as the known machines must employ extremely strong springs to surely and firmly press the spindle drum against the stop pawl. The inclined surface of the bolt cooperates with a plurality of fixed stops 52 corresponding in number to that of spindles provided in the machine. As may be seen from Fig. 6, the depressions made in the spindle drum 44 for the stops 52 are arranged in the centre of the front bearing of the spindle drum. In the prolongation of the bore for the stops 52 the adjustable counterstops 51 are arranged which bear against a spring actuated stop pawl 53 pivoted in the lower portion of the spindle box 3. As the stops 51 and 53 are arranged in the same plane, a tipping of the spindle drum is prevented. The pressure against the stop pawl is, however, not received by the pivot of the pawl, but by a hardened plate 54 rigidly fixed to the side wall of the bed 2. Hereby the pressure of the bolt 55 as well as the pressure P of the tool (Fig. 8) in direction of the arrow C are not received, as in other machines, by the spindle box 3, but directly by the side wall of the bed which assures a working free of vibrations and prevents damage of the pawl pivot. It is to be observed, that the stop surface of the pawl 53 is vertically arranged below the centre of the drum, so that a turning of the spindle drum 44 during clamping cannot occur. Moreover, during operation the spindle drum 44 is, after turning, fixed in its bearings by a brake band 50 which also is arranged in the front bearing of the spindle drum. For this purpose the cap of the spindle drum bearing is, as may be seen from Fig. 6, recessed to receive the brake band which is fixed by screws to the front side of the spindle box 3, whereas the free end of this brake band is drawn and tensioned by an eccenter cam shaft 56 in the direction of the arrow A which has the same direction as the tooth pressure Z and the bolt pressure C.

The turning direction as well as the distribution of the spindles or the arrangement of the succession of the operating positions is chosen in the new machine differently from the known machines. The drum 44 turns in a direction opposite to that of the hands of a watch, as shown by the spindle positions I—VI in Fig. 3. By this arrangement of the spindles and the described direction of turning of the spindle drum, all forces act in the same direction and are not, as in other machines, received by the locking bolt, but by the stop pawl 53, whereby an absolutely sure bearing of the drum 44 against the pawl 53 and in its bushings is warranted and the bolt itself is relieved. If desired the complete cover of the spindle box may be constructed as brake band.

The tightening and loosening of the brake band is effected by the eccenter cam 59 which is fixed upon the feed shaft 74 and transfers the movement upon the tightening lever 56 means of a lever 58 and a push rod 57. As the feed shaft 74 or 740 makes, during one feed period, one complete revolution only, whereas the shaft 80 makes several revolutions in the same time, a cam disc 79 is fixed upon the shaft 740 which acts upon the rod 133 and effects at a given moment the start of the movement at the pawl disc 78. The same function has the cam disc 90, arranged upon the cam shaft 89, as the tightening cam also is allowed to make one complete revolution only during the tightening period.

Upon the shaft 74 a cam disc 81 is arranged by which, after completion of the working period, the segment levers 23 for the side carriages are quickly returned by a lever system 212, 213 and 214, so that all side or cross carriages are returned before the turning begins. Also arranged upon the cam shaft 89 is a special cam disc 91 which is connected to the pivot 24 by means of the lever system 92 and 93 for the purpose of a quick advance and return movement of any auxiliary devices, as stops, clamping members or the like which must harmonize with the tightening.

Auxiliary cams 94 may be mounted upon the shafts 18 and 19 for actuating in a well-known manner auxiliary devices, known by themselves as a thread cutting device, clamping members, stops and the like, required for each automatic screw machine. By arranging the two cam shafts 18 and 19 at the outside of the machine, the latter becomes indeed a universal machine, as hereby any situation may be met, and moreover the cams are completely separated from the cuttings.

It is still to be observed, that the central tool carriage 7 as well as the bridge 5 are provided with oil channels 45 and 140 respectively for obtaining a covered admission of the lubricating liquid to the tools of the central and cross carriages. These oil channels are provided with twenty-four outlets, so that for the high cutting capacities sufficient lubricating liquid may be fed to the tools without using pipings which always are hindering. The pipes for feeding oil to the central tool carriage 7 are arranged in the bores 140 which are arranged in the range of the spindles at the right and left of the point of attack of the force, so that a tipping of the stuffing boxes of the telescoping tubes or pipes is prevented.

As shown in Fig. 3, the bed 2 is perforated in the middle portion to allow the discharge of the cuttings. To obtain a sufficient stiffening, the bed is provided with double walls at the right-and-left-hand side. The cuttings are not discharged, as usual, at the side of the bed, but a longitudinal channel is formed through the bed 2 and the cuttings pit between frame 1 and bed below the spindle box through which the cuttings are, after dropping, at once fed, by means of a conveyor band not shown in the drawings, to the cuttings pan m arranged in the prolongation of the cuttings pit between frame 1 and bed. The longer way for the discharge of the cuttings is chosen for the purpose, that the lubricating medium adhering to the cuttings has time to flow off.

As the bottom of the channel in the cuttings pit is inclined towards the oil reservoir, the lubricating medium dropping off is returned to the oil reservoir as shown in Fig. 14. As may be seen from Figures 12–14, the front wall $q$ of the under frame as well as of the bed 2 is completely closed to prevent splashing of the lubricating medium during operations. The rear walls of the under frame 1 and the bed 2, however, have a hole, to obtain access to the conveyer band in case of troubles. The under frame 1 is divided by partition walls into several compartments $a$ to $k$ which are connected with each other by corresponding openings and are closed by screens. As may be seen from Figs. 13 and 14, the compartment $a$ is connected to the compartment $f$ by an opening $e$. The compartments $f$ and $g$ are each separated from the compartment $a$ by screens which are indicated by dotted lines only. The oil, therefore, must flow in the direction of the arrows and passes through the holes $h$ and the compartment $i$ to the compartment $k$, then through a screen again to the compartment $c$ and from there to the suction space $d$. The free accessible compartments $a$, $f$, $g$, $i$, $k$ and $d$ are provided with lateral projections $x$ and $z$ for the reception of perforated sheet metal plates which for the purpose of cleaning each individual chamber may be removed. Moreover, two holes $r$ and $s$ are provided for cleaning purposes against which the bottom is inclined. The wall $y$ separates the cuttings space $m$ from the oil chambers, so that the space of the cuttings pit may completely be used for the oil circulation and an absolute cooling of the lubricating liquid is obtained. The conveyer band for the cuttings is not shown in the drawings, as an ordinary endless perforated band is used for this purpose.

What I claim is:

1. In a multiple-spindle automatic screw machine in combination with a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms to intermittently move said two special cams and means for automatically connecting the two driving mechanisms to their respective cams for arresting the movement of one of said special cams during the movement of the other of said special cams.

2. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms for intermittently moving said two special cams, clutches for connecting and disconnecting the driving mechanisms to their respective cams, and means for automatically controlling the connection and disconnection of said driving mechanisms for arresting the movement of one of said special cams during the movement of the other of said special cams, said cam shafts arranged at the front and rear side of said machine being positively connected to the cam controlling the working stroke of said central tool carriage.

3. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms for intermittently moving said two special cams, clutches for connecting and disconnecting the driving mechanisms to their respective cams, and means for automatically controlling the connection and disconnection of said driving mechanisms for arresting the movement of one of said special cams during the movement of the other of said special cams, said first-mentioned cam shafts arranged at the front and rear side of said machine being positively connected to the cam controlling the working stroke of said central tool carriage, a feed shaft, another cam on the feed shaft for effecting the quick return stroke of said side carriages and means for accelerating the working cam to effect the quick advance stroke of said carriage.

4. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from and adapted to become alternately active for intermittently moving said two special cams and means for arresting the movement of one of said special cams during the movement of the other of said special cams, a single shaft and means for intermittently rotating said single shaft at different speeds from which the working strokes and the idle strokes are derived.

5. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from but capable of becoming alternately active for intermittently moving said two special cams and means for arresting the movement of one of said special cams during the movement of the other of said special cams, driving mechanisms for effecting the clamping drum turning and return stroke of said central tool carriage, a single common driving shaft, means for intermittently rotating said single shaft at different speeds, and selectively operated control means for independently and releasably connecting the said last mentioned driving mechanisms and elements for respectively effecting the clamping, drum turning and return stroke of the central tool carriage as well as the working and idle strokes thereof from the common driving shaft so that during setting the one or the other movements cannot occur.

6. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from but capable of becoming alternately active for intermittently moving said two special cams and means for arresting the movement of one of said special cams during the movement of the other of said special cams, another for effecting the movements of said central tool carriage located between the said two first mentioned cam shafts in the longitudinal centre line of said machine, a common shaft, three worms carried by said common shaft, and worm wheels carried by the three shafts for effecting the movements of said central tool carriage and meshing with the said worms and having a uniform rate of gear so that all of said three shafts are turned simultaneously and about the same angle and simultaneously arrested.

7. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from but capable of becoming alternately active for intermittently moving said two special cams and means for arresting the movement of one of said special cams during the movement of the other of said special cams, another shaft located between said two first mentioned cam shafts, a cam drum controlling the working stroke of said central tool carriage rigidly connected to said last mentioned shaft, the cam controlling the idle stroke of said central tool carriage being loosely mounted upon said last mentioned shaft, and means for driving said last mentioned cam at a higher speed and independently of said rigid cam on the medial cam shaft.

8. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages and a third intermediate cam shaft, a special cam for controlling the working stroke of said central carriage mounted upon one of said shafts, a second special cam for controlling the idle stroke of said central carriage, two driving mechanisms separated from but capable of becoming alternately active for intermittently moving said two special cams and means for arresting the movement of one of said special cams during the movement of the other of said special cams, a single common driving shaft means for intermittently rotating said single shaft at different speeds, other driving mechanisms for effecting the clamping, drum turning and the return strokes of the said central tool carriage, means associated with said driving mechanisms so that the same may be connected to and disconnected from the common driving shaft, so that during setting the one or other movement cannot occur, said connecting and disconnecting means of the several driving mechanisms including a plurality of additional cams arranged upon said two first-mentioned cam shafts, whereby the cam arresting the said three cam shafts is loosely mounted upon the second cam shaft and positively connected to the other cam, so that both make a complete revolution in the same time.

9. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from and adapted to be alternately active for intermittently moving said two special cams and means for arresting the movement of one of said special cams during the movement of the other of said special cams, a single common driving shaft means for intermittently rotating said single shaft at different speeds, a mechanical feed drive, a hand drive, sliding gear provided with clutch members for association with said drives, and a single lever associated with the sliding gear whereby the common drive shaft is adapted to be alternately coupled to the gear box for the mechanical feed drive and to the hand drive.

10. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, two driving mechanisms separated from but adapted to become alternately active for intermittently moving said two special cams, means for arresting the movement of one of said special cams during the movement of the other of said special cams, a worm wheel, an intermediate shaft for carrying the wheel and to which wheel and shaft said cam controlling the working stroke of said central tool carriage is rigidly connected while said cam controlling the idle stroke of said central tool carriage is loosely mounted upon said intermediate shaft, and means for driving said latter cam at a higher speed and independently of said first cam when the cam is shifted, a rack fixed to the said central tool carriage, a slide movably arranged in the machine bed and in engagement with said rack, a gear rotatably journalled in the guide, an adjustable rack engaging said latter gear, and a roller slide.

11. In a multiple-spindle automatic screw machine in combination a spindle box, a gear box, a bridge connecting the latter to said spindle box, tool carriages including a central carriage and side carriages, cam shafts carrying cams for actuating said tool carriages, including cam shafts arranged at the front and rear side of the machine for actuating said side carriages, a special cam for controlling the working stroke of said central carriage mounted upon one of said shafts, a second special cam for controlling the idle stroke of said central carriage, a common drive shaft, two driving mechanisms driven from the common drive shaft and selectively connected to the two special cams for intermittently moving said two special cams and means for arresting the movement of one of said special cams during the movement of the other of said special cams, a spindle turret drum, a toothed ring carried by the drum, a counter coupling gear constantly engaging the toothed ring, an elongated toothed wheel loosely mounted upon said common drive shaft, a feed wheel fixed to said drive shaft and a pawl disc for intermittently driving said toothed wheel, a divided feed shaft, gear wheels fixed to said divided feed shaft, a crank pin connecting said gear wheels and engaging with said elongated toothed wheel, a link connected to said crank pin a rack and a shaft carried by said link a shiftable coupling gear carried by said latter shaft and rotated by the said rack and, moved up and down by its connection to said crank pin, and temporarily coupling and rotating the counter coupling gear, whereby the said spindle drum is easily turned intermittently and free of jerks.

12. In a multiple-spindle automatic screw machine as set forth in claim 11 in which a shaft is mounted in the spindle box for supporting said counter coupling gear at the side of said spindle drum at which the turning movement of said drum is directed upwardly, whereby said drum during turning is lifted a little and the weight of said drum counteract, so that the turning of said drum is facilitated and the bearings are saved as the friction is reduced.

13. In a multiple-spindle automatic screw machine as set forth in claim 3, a spindle turret drum a brake band connected at one end to a fixed part of the machine and arranged in a recess of the front bearing portion of the cover of said spindle box, a cam shaft and a cam mounted on said feed shaft, means on the cam consisting of a lever and a rod, acting upon the other end of said brake band to firmly press said spindle drum into the under frame of said spindle box and to obtain an operation free of vibrations.

14. In a multiple-spindle automatic screw machine as set forth in claim 1, a spindle turret drum, a stop pawl associated therewith a brake band acting upon said spindle drum and tightened in direction opposite to the turning direction of said drum against said stop pawl.

15. In a multiple-spindle automatic screw machine as set forth in claim 1, a spindle turret drum having recesses, a plurality of spindles, a plurality of stops and set screws each corresponding in number to that of the spindles provided in the machine, said stops and said screws being all arranged in one plane in the recesses formed in the centre of the running face of the drum, so that said surface is not interrupted and therefore a tipping of the drum during locking is prevented.

16. In a multiple-spindle automatic screw machine as set forth in claim 1, a machine bed, a spindle turret drum, a bolt and a stop pawl arranged in the same plane in the centre of the front bearing portion of said drum in such a manner, that the front face of said pawl is vertical, a hardened plate 54 fixed to the bed of said machine and against which the rear face of the pawl bears and which serves to receive the pressure of the bolt and of the brake, whereas said bolt is horizontally guided and provided with an inclined surface directed toward said drum, so that the said drum is pressed by said bolt against said stop pawl.

17. In a multiple-spindle automatic screw machine, as set forth in claim 1, a spindle turret drum, a stop pawl, a bolt, a spring associated with the bolt a cam shaft, two cams fixed to said shaft 74 and controlling the movement of said bolt in both directions, so that the said bolt after snapping in under the action of said spring is locked and pressed into engagement with said drum, thereby firmly pressing said drum against said stop pawl.

18. In a multiple-spindle automatic screw machine as set forth in claim 1, a machine bed, a spindle turret drum, a stop pawl arranged in the lower portion of said spindle box in such a manner, that the tooth pressure due to the cutting pressure and the torque resulting therefrom and acting upon said drum is taken up by said stop pawl and transferred to the bed of the machine, so that said pressure cannot act against said bolt, which thereby is relieved.

19. In a multiple-spindle automatic screw machine as set forth in claim 1, in which turret drum is provided and counter-clockwisely turned, and a counter-coupling gear arranged on the rear side of the machine and operatively associated with said drum spindle moves rearwardly, while the two lowermost carriages arranged upon the bed of the machine are used for rough-cutting operations, and the two uppermost carriages suspended from said bridge are used for the fine-cutting operations, while for performing light cuts other spindle positions are provided.

20. In a multiple-spindle automatic screw machine as set forth in claim 1, a flat carriage suspended in a vertical plane at the lower portion of said spindle box and a cutting off tool, and cam 220 mounted upon one of the first mentioned cam shafts for centrally moving said cutting off tool.

21. In a multiple-spindle automatic screw machine as set forth in claim 1 in which the under frame of the machine is subdivided into several closed compartments connected by lateral holes with a drop pan also subdivided in a plurality of compartments said first mentioned compartments being also interconnected by holes, screens covering the last mentioned holes, and perforated sheet metal plates covering the tops of said first mentioned compartments, the arrangement being such, that a continuous channel is formed from the cuttings pit $a$ to the suction space $d$ which channel may at any time easily be cleaned by removing said perforated plates and said screens.

22. In a multiple-spindle automatic screw machine as set forth in claim 11, a bed, a shaft 89 therein, a clamping and feed cam 88 fixed upon said shaft, means for temporarily driving said cam from said drive shaft including a feed wheel, a pawl disc and gear wheels, other cams for controlling the start of the movement of said feed cam arranged upon said cam shaft, and a lever system and a cam fixed to said first mentioned cam shaft serves to arrest the movement of said cam.

23. In a multiple-spindle automatic screw machine as set forth in claim 1 in which a wall is provided at the front side of the machine for conducting the standards of the machine bed to prevent splashing of lubricating medium.

24. In a multiple-spindle automatic screw machine as set forth in claim 1, a bed, a cutting pit, a cuttings reservoir, means for automatically discharging the cuttings in the longitudinal direction of the machine bed from the cuttings pit to the cuttings reservoir.

25. In a multiple-spindle automatic screw machine as claimed in claim 11, in which a clamping and feeding cam is provided and driven temporarily by said common drive shaft for quickly advancing and retracting said side carriages, and mechanisms adapted to be associated therewith and means for effecting operation of said cam for such purposes including a shaft, a special cam fixed to said latter shaft, a lever system, segments on said carriages and other shafts adapted to be associated with the said mechanisms.

26. In a multiple-spindle automatic screw machine as claimed in claim 10, a cam roller associated with the idle cam for reciprocating the slide whereby either said central tool carriage or said roller slide makes double the travel of said slide, whereas when said idle cam has drawn said slide into its outermost position to the right and said central tool carriage also occupies its rearmost position, the working cam may pass freely without movement being transferred to the said central tool carriage.

27. In a multiple-spindle automatic screw machine as claimed in claim 10, wherein a centre shaft is provided and has said central tool carriage slidably arranged thereon, two guides on said central tool carriage forming an angle of 90°, an extension on said gear box, two guide rails adjustably fixed to the extension of said gear box and having the guides slidably mounted thereon, the slide faces of said guides and said guide rails being so arranged as to lie out of range of the centers of said spindles and to cause an oscillation of said central tool carriage about its centre shaft on an adjustment of said guide rails which for the purpose of exactly setting the said clamping faces relatively to said spindle centres is essential whereby the weight of said central tool carriage is taken by said guide rails and therefore the said centre shaft is relieved and saved.

28. In a multiple-spindle automatic screw machine as claimed in claim 10, wherein a centre shaft is provided and has said central tool carriage slidably arranged thereon, two guides on said central tool carriage forming an angle of 90°, an extension on said gear box, two guide rails adjustably fixed to the extension of said gear box and having the guides slidably mounted thereon, the slide faces of said guides and said guide rails being so arranged as to lie out of range of the centers of said spindles and to cause an oscillation of said central tool carriage about its centre shaft on an adjustment of said guide rails which for the purpose of exactly setting the said clamping faces relatively to said spindle centres is essential whereby the weight of said central tool carriage is taken by said guide rails and therefore the said centre shaft is relieved and saved, and a transfer gear between the two lowermost of said spindles and between said guides of said central tool carriage the arrangement being such that firstly all spindles are free for driving additional devices, secondly the point of attack of the feed power upon the rack fixed to the central tool carriage lies between the said guide faces and thirdly the top of the said central tool carriage is completely free for attaching any desired additional devices.

In testimony whereof I affix my signature.

ANTON GERSTADT.